UNITED STATES PATENT OFFICE 2,645,608

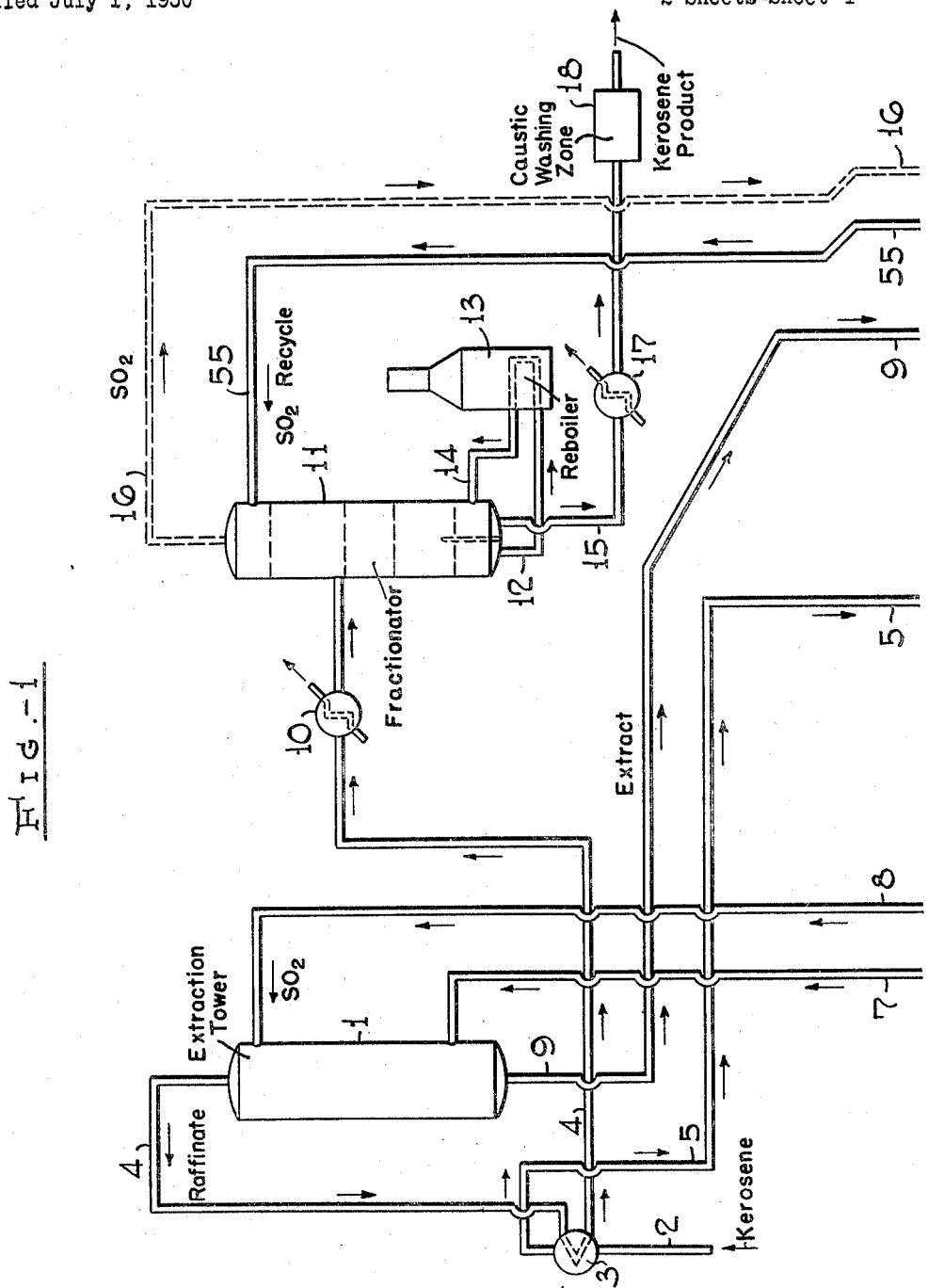

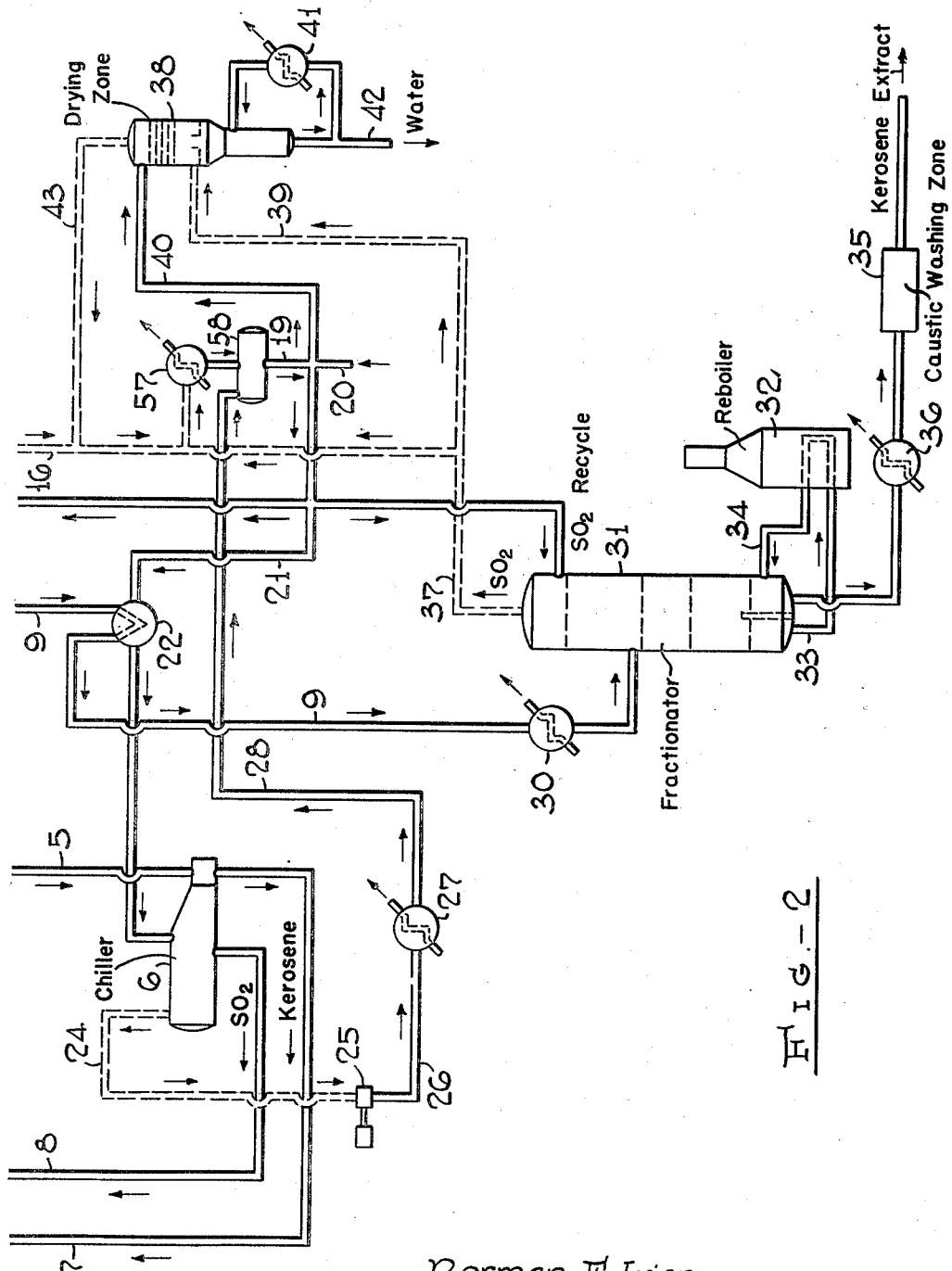

SULFUR DIOXIDE EXTRACTION PROCESS

Norman F. Linn, Summit, Henry Ernst, Jr., Fanwood, and Arthur K. Scott, Westfield, N. J., assignors to Standard Oil Development Company, a corporation of Delaware Application July 1, 1950, Serial No. 171,612

6 Claims. (Cl. 202—40)

This invention concerns a process for the selective removal of undesired constituents from hydrocarbon fractions by contacting such fractions with liquid sulfur dioxide. The invention resides in the provision of a greatly simplified process for separating sulfur dioxide from the mixtures of hydrocarbons and sulfur dioxide resulting from the contact. In accordance with this invention, raffinate and extract streams, produced by the contacting of a feed stream with sulfur dioxide, are each purified in a simple system employing a reboiler type fractionator and a caustic washing stage. The process is consequently operable with a minimum of processing equipment, and is characterized, for example, by elimination of many of the compressors and all of the evaporation stages ordinarily employed in the sulfur dioxide extraction process.

For many years it has been appreciated that certain hydrocarbon fractions obtained in the refining of petroleum could be upgraded by selective removal of aromatic hydrocarbon constituents. For example, the quality of kerosene as regards its burning characteristics may be greatly improved by the removal of aromatic hydrocarbons and sulfur containing hydrocarbons. Again, the viscosity index of lubricating oils, the cetane number of diesel fuels, and other properties may favorably be improved by removing undesired constituents from these petroleum fractions. In order to achieve these objectives a variety of treating processes have been suggested. One of these processes is a solvent extraction process employing liquid sulfur dioxide to selectively extract the above mentioned constituents. The sulfur dioxide extraction process has been in commercial operation since about 1909. However, as conventionally practiced the process entails the use of extensive plant facilities. It is the principal object of this invention to greatly simplify the commercial sulfur dioxide extraction processes in a manner exemplified by the material savings in processing equipment.

The manner in which this is achieved resides in the method employed for processing the raffinate and extract streams from the sulfur dioxide contacting step of the process. Heretofore, it has been considered a binding limitation to prevent heating of the extract and raffinate streams to temperatures above about 300° F. For this reason, a separation of sulfur dioxide from the extract and raffinate streams has been accomplished by a complicated multi-stage system of evaporators. It has now been found possible, by employing a reboiler type of fractionator operating at high pressure and by heating the extract and raffinate streams well above conventional temperatures, to effect substantially complete separation of sulfur dioxide from the extract or raffinate phase, in a single fractionation zone. This and other features of the present invention may be appreciated by reference to the accompanying drawings which diagrammatically illustrate a flow plan of an extraction process embodying the invention. Figure 1 of the drawings represents a portion of the process, while Figure 2 is a continuation of Figure 1 showing the remaining portion of the process.

Referring now to the drawings, a complete description of the present process will be given. At the same time operative temperature and pressure ranges will be given so as to exemplify a suitable manner of conducting this invention.

In the drawing the numeral 1 designates a treating tower in which liquid sulfur dioxide may be contacted with the hydrocarbon fraction which is to be treated. It may be assumed that the hydrocarbon fraction to be treated is a kerosene fraction. In fact the present process is of particular application to kerosene or diesel oil or, in other words, to petroleum hydrocarbons boiling in the range of about 325 to 650° F., although the process may be applied to other fractions such as lubricating oils. A suitable feed stream, such as kerosene, is introduced to the system through line 2. It is to be understood that this stream has been dried so as to eliminate water, and that the stream has also preferably been substantially deaerated. Conventional methods for eliminating air and water may be employed. As an example, it is assumed that the feed stream of line 2 is at a temperature of about 80° F., so that it is necessary to cool the stream to the treating temperature, for example, about 20° F., prior to introduction to treating tower 1. The treating temperature is generally in the range of —10° F. to +40° F. For this purpose the feed stream may be passed through heat exchanger 3 in heat exchange relationship with raffinate from treating tower 1, removed through line 4 as will be described. It is thus possible to drop the temperature of the feed stream from about 80° F., to about 45° F. The additional cooling required may be carried out by passing the kerosene feed stream through line 5 to chiller 6 wherein the stream is passed through coils in heat exchange relation with liquid sulfur dioxide maintained in chiller 6, at a temperature of about 15° F. as will be described hereinafter. This operation will be effective in decreasing the temperature of the kerosene to about 20° F. so that the kerosene may be removed from chiller 6 through line 7 for introduction to the treating tower. Liquid sulfur dioxide is also withdrawn from chiller 6 and is conducted through line 8 for introduction to treating tower 1.

The sulfur dioxide contacting tower 1 may be of conventional design, of a nature to provide for the intimate contacting of the liquid sulfur dioxide, and the kerosene. As illustrated, this may be conducted in a countercurrent treating tower equipped with means for intimately contacting the two streams. For example, tower 1 may be filled with suitable packing material, such as Raschig rings, or other internal contacting means so that the kerosene moving upwardly through the tower countercurrent to the sulfur dioxide moving downwardly through the tower will be intimately contacted thereby. It is preferred that about 20 to 150 volumes of sulfur dioxide be used per volume of kerosene treated. The particular quantity will depend upon the nature of the hydrocarbon fraction being treated, and upon the extent of selective extraction desired. The contacting of the sulfur dioxide and kerosene in the countercurrent manner indicated is effective to permit removal of a stream from the top of the tower generally known as the raffinate phase consisting principally of non-aromatic constituents of the hydrocarbon feed, together with sulfur dioxide. In general the raffinate phase will contain about 10 to 15 percent of sulfur dioxide and after proper contacting will contain substantially less aromatic constituents than that contained in the raw feed. In the processing of the raffinate phase it is necessary that the sulfur dioxide be separated from the hydrocarbon constituents.

The stream of material withdrawn from the bottom of treating tower 1, through line 9, is generally called the extract phase, and will consist principally of sulfur dioxide together with constituents extracted from the original hydrocarbon feed. Again, it is necessary in the processing of this stream that the hydrocarbons be separated from the sulfur dioxide.

As indicated, therefore, in the operation of a sulfur dioxide extraction process, extract and raffinate phases are obtained consisting of hydrocarbon, sulfur dioxide mixtures. The particular novelty of this invention relates to the manner in which this separation is accomplished. In essence the separation of sulfur dioxide from the raffinate phase is the same in principle as the separation of sulfur dioxide from the extract phase. However, full details of both of these separations will be given in order to fully disclose the process of this invention.

Referring first to the separation of sulfur dioxide from the raffinate phase, the raffinate phase removed from tower 1 through line 4 may be passed through heat exchanger 3 in the manner formerly indicated. This will be effective to raise the temperature of the raffinate phase from about 20° F. to about 60° F. It is desirable that the raffinate phase be heated to a considerably higher temperature, so that a preheater 10 is provided in line 4, effective to heat the raffinate to a temperature of about 20° to 275° F. This will have the effect of converting most of the sulfur dioxide to vapor form, although only a portion of the hydrocarbon constituents of the raffinate will be vaporized. Upon then introducing the heated raffinate phase of line 4 to fractionator 11, effective fractionation may be carried out, depending upon a reboiler circuit to supply the remaining heat requirements of the fractionation. Thus, fractionator 11 will consist of a tower provided with sufficient plates to provide a total of about 4 or more theoretical plates. The raffinate phase of line 4 is introduced to the fractionation zone at about the middle thereof, so that about the same number of plates are provided above the point of feed as are provided below the feed point. It is preferable that the entire fractionation be conducted in a zone operated at a pressure well above atmospheric, for the purpose hereinafter to be shown, permitting condensation of sulfur dioxide by using cooling water at temperatures commonly available. On introducing the heated raffinate phase to tower 11 at about 65 to 150 p. s. i. g., a portion of the raffinate phase will pass upwardly in the fractionation zone as a vapor, while the greater portion will drop downwardly through the fractionation zone as a liquid. To balance the heat requirements of the fractionation, a liquid stream is removed from the bottom of fractionator 11 through line 12 and is passed through the reboiler 13 effective to raise the temperature of the stream sufficiently to provide the necessary heat, necessitating heating to about 400 to 500° F. In a typical case, the stream withdrawn through line 12 may be withdrawn at a temperature of about 380° F., and will be heated in reboiler 13 to a temperature of about 455° F., after which it is then returned to fractionator 11 through line 14. This heating is sufficient to convert the liquid material of line 12 to a vaporous material in line 14. The vapors of line 14 rising through the lower subdivided portion of the fractionator serve to strip substantially all sulfur dioxide from the liquid directed downwardly past the vapor inlet 14 to be removed through line 15. The liquid bottoms product of fractionator 11, therefore, constitutes hydrocarbons containing below about 0.002 mol fraction of sulfur dioxide. The sulfur dioxide driven upwardly through the fractionator 11 is fractionated therein, aided by liquid sulfur dioxide reflux introduced through line 55, and is removed from the top of the fractionator through line 16. The sulfur dioxide removed is substantially pure.

Operation of the fractionator 11 is a critical operation which must be conducted under carefully controlled conditions to achieve the objects of this invention. For example, as indicated a reboiler circuit is operated in conjunction with the fractionator in which hydrocarbon constituents together with some sulfur dioxide are heated to a temperature of about 400 to 500° F. This temperature is sufficiently high to permit adverse color degradation of the hydrocarbons if maintained for any very long period. For example, material color degradation will occur if the kerosene is maintained above about 350° F. for as much as 10 minutes. In the operation of the fractionator as described, however, this is avoided by limiting the average holdup time of the hydrocarbons at the high temperatures indicated to considerably less than about 10 minutes. This is possible according to the process described, since about 30 to 70% of the heat requirements of the fractionation are supplied by preheating the raffinate prior to introduction to fractionator 11. Consequently, the passage of liquid products through reboiler 13 to provide the remaining heat requirements may be conducted to maintain the holdup time in the reboiler circuit to well below 10 minutes, and in fact to a few seconds.

The raffinate of line 15 is completely processed by cooling in cooler 17 to a temperature below about 135° F. after which the raffinate is subjected to a caustic wash in zone 18 to eliminate any traces of sulfur dioxide remaining. For this purpose the raffinate may be contacted with about 10 to 35 per cent treat of 5 to 10° Bé. caustic in the contacting zone.

The sulfur dioxide, removed from fractionator 11 through line 16 at a temperature of about 100° to 145° F., is conducted to a condenser 57 operated at a temperature and pressure to liquefy the sulfur dioxide. For example, if condenser 57 is operated at a temperature of about 110° F. and a pressure of 85 p. s. i. g., suitable liquefaction may be achieved. The liquid sulfur dioxide from condensate drum 58 may then be removed from this drum through line 19, for use in the process as required. Thus, sulfur dioxide of line 19 together with any makeup sulfur dioxide required introduced through line 20 may be conducted through line 21 through cooler 22 and thence to sulfur dioxide chiller 6. Heat exchanger 22 is preferably operated to drop the temperature of the sulfur dioxide from about 110° F. to about 61° F. In sulfur dioxide chiller 6, operated at about 0.5 p. s. i. g., evaporation of a portion of the sulfur dioxide will occur effective to provide sufficient auto-refrigeration so as to cool the liquid sulfur dioxide to a temperature of about 15° F. The liquid sulfur dioxide may then be withdrawn through line 8 for use in the process as formerly described. Vapors of sulfur dioxide produced during the auto-refrigeration, are removed from chiller 6 through line 24 at a temperature of about 15° F., and are conducted to compressor 25, operated to compress the sulfur dioxide to about 90 p. s. i. g., and to a temperature of about 267° F. This sulfur dioxide is then passed through line 26 and is cooled in heat exchanger 27 to a temperature of about 110° F., effective to cause liquefaction of the sulfur dioxide which may then be pumped to the sulfur dioxide storage drum 58 through line 28.

The remaining portions of the drawing relate principally to the manner in which the extract phase of line 9 is processed to separate the hydrocarbons therein from the sulfur dioxide which is the principal constituent of the extract phase. This separation is accomplished in a similar manner to that described in connection with processing of the raffinate stream. Thus, the extract phase is passed through line 9, heat exchanger 22, and heat exchanger 30, so as to raise the extract from about 20° F. to about 250° F. The extract is then introduced to a fractionator 31 similar to fractionator 11 formerly described. However, fractionator 31 required about 5 or more theoretical plates, a greater number of the theoretical plates being above the extract phase feed input than below the feed input when the minimum number of plates are employed. The reboiler 32 is operated similarly to that associated with fractionator 11, although at a somewhat higher temperature level. For example, the liquid may be withdrawn from fractionator 31 through line 33 at a temperature of about 438° F. and may be converted to a vapor in line 34, at a temperature of about 487° F. As operated in this manner fractionator 31 will be effective to provide a liquid bottoms product containing less than about 0.002 mol fraction of sulfur dioxide, which may be removed by means of a caustic wash applied in zone 35 operated similarly to caustic wash zone 18. Again, it is preferred that prior to caustic wash the extract be cooled to a temperature below about 135° F., by use of the cooler 36. The sulfur dioxide obtained overhead from fractionator 31 at a temperature of about 115° F., will contain substantially no hydrocarbons and consequently can be conducted through line 37 to condenser 57 and thence to the liquid receiver 58. A portion of the sulfur dioxide is continuously, or periodically processed in a drying column 38 to eliminate any moisture present. Thus, a portion of the sulfur dioxide of line 37 may be introduced to the lower portion of a fractionation zone 38 through line 39, while liquid sulfur dioxide from line 19 is introduced to the top of the fractionator through line 40. The reboiler circuit 41 is operated to provide the heat requirements necessary to permit removal of water from the bottom of fractionator 38 through line 42, and to permit removal of the dried sulfur dioxide from the top of the tower through line 43.

As heretofore described the process of this invention particularly concerns the manner in which extract and raffinate phases of a sulfur dioxide extraction unit are purified. As disclosed, each of these phases are to be preheated sufficiently to provide about 30 to 70% of the heat requirements of a single fractionation zone. The remaining heat requirements of the fractionation zone are provided by a reboiler circuit operated at temperatures above 400° F., and preferably above about 450° F. By providing at least 4 theoretical plates in the fractionation zone, it is possible to secure sharp fractionation between sulfur dioxide, and the hydrocarbons present in either the extract phase or the raffinate phase. The hydrocarbons separated in the fractionation zone may then be completely purified by utilization of a caustic wash.

While this invention has been described with regard to use of a single fractionation zone for purifying extract or raffinate phases, the principles of this invention may also be applied to a system employing two rather than one fractionation zones. In this case lower temperatures may be maintained in the reboiler circuits falling in the range of about 325 to 500° F. In this case it is also desirable to operate the second of the fractionation zones at a pressure of about atmospheric to 50 p. s. i. g.

What is claimed is:

1. In a process for the selective extraction of constituents from a hydrocarbon distillate in which the hydrocarbon distillate is contacted with liquid sulfur dioxide to provide extract and raffinate streams, the improvement which comprises separately processing at least one of said streams as follows: pre-heating said stream to a temperature of at least about 200° F., passing said heated stream to at least one fractionation zone, withdrawing gas comprising sulfur dioxide from the top of the fractionation zone, cooling and condensing said sulfur dioxide and returning at least a portion of the liquefied sulfur dioxide to the fractionation zone as reflux, withdrawing liquid comprising hydrocarbons from the bottom of the fractionation zone and heating at least a portion of the said withdrawn liquid to a temperature of about 400° to 500° F., and returning said heated portion to the bottom of the fractionation zone, said process being characterized by an average holdup time of the hydrocarbons at a temperature above 350° F. of less than 10 minutes.

2. The process defined by claim 1 in which the said fractionation zone is maintained at about 65 to 150 p. s. i. g.

3. The process defined by claim 1 in which the said pre-heating of the said stream is sufficient to supply about 30 to 70% of the heat requirements of the said fractionation.

4. The process defined by claim 1 in which the said hydrocarbon distillate constitutes a lubricating oil.

5. The process defined by claim 1 in which the said hydrocarbon distillate constitutes kerosene.

6. The process defined by claim 1 in which the said hydrocarbon distillate constitutes diesel oil.

NORMAN F. LINN.
    HENRY ERNST, Jr.
    ARTHUR K. SCOTT.

References Cited in the file of this patent

UNITED STATES PATENTS

| Number | Name | Date |
|---|---|---|
| 2,070,864 | Ragatz | Feb. 16, 1937 |
| 2,071,590 | Thiele et al. | Feb. 23, 1937 |
| 2,185,311 | Ragatz | Jan. 2, 1940 |

FOREIGN PATENTS

| Number | Country | Date |
|---|---|---|
| 567,938 | Great Britain | Mar. 9, 1945 |